United States Patent [19]

Schrecongost

[11] Patent Number: 5,024,455
[45] Date of Patent: Jun. 18, 1991

[54] LUGGAGE CART

[76] Inventor: Ray B. Schrecongost, 2412 W. Sibley St., Park Ridge, Ill. 60068

[21] Appl. No.: 535,908
[22] Filed: Jun. 11, 1990
[51] Int. Cl.[5] .............................................. B62B 1/04
[52] U.S. Cl. ................................. 280/37; 190/18 A; 280/47.26; 280/47.315
[58] Field of Search .............. 190/18 A; 280/639, 37, 280/652, 654, 655, 47.26, 47.315, 47.371

[56] References Cited

U.S. PATENT DOCUMENTS

| | | | |
|---|---|---|---|
| 1,352,234 | 9/1920 | Whitten | 280/47.26 |
| 1,926,134 | 9/1933 | Beard | 190/18 A |
| 2,729,460 | 1/1956 | Forman | 280/47.26 X |
| 3,841,650 | 10/1974 | Miskelly | 280/37 |
| 3,842,953 | 10/1974 | Royet | 190/18 A |
| 3,845,968 | 11/1974 | Larson | 280/36 C |
| 3,960,252 | 6/1976 | Cassimally | 190/18 A |
| 4,087,102 | 5/1978 | Sprague | 280/37 |
| 4,340,132 | 7/1982 | Cerna | 190/18 A |
| 4,411,343 | 10/1983 | Cassimally et al. | 190/18 A |
| 4,523,773 | 6/1985 | Holtz | 280/654 |
| 4,743,038 | 5/1988 | Myers et al. | 280/47.26 X |

Primary Examiner—Andres Kashnikow
Assistant Examiner—Michael Mar
Attorney, Agent, or Firm—Neuman, Williams, Anderson & Olson

[57] ABSTRACT

A luggage cart adapted to remain attached to the luggage during stowage includes a wheeled support structure and a pair of bracket members set apart by the length of a piece of luggage. The bracket members are conformed to the shape of the cross-sectional contour of the rim of the piece of luggage to be transported and are clamped in position between two halves of the luggage to connect the luggage to the cart.

9 Claims, 2 Drawing Sheets

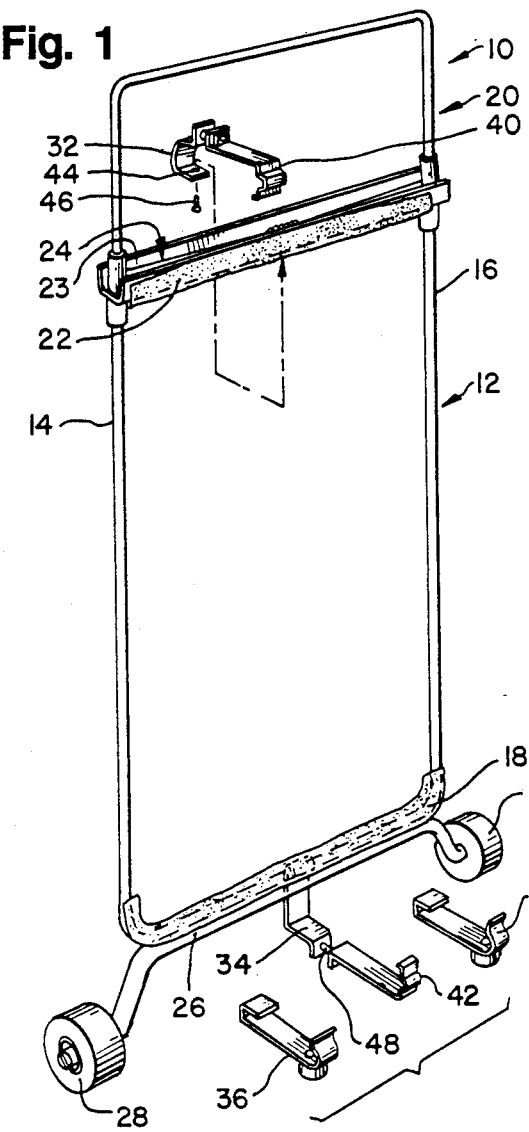
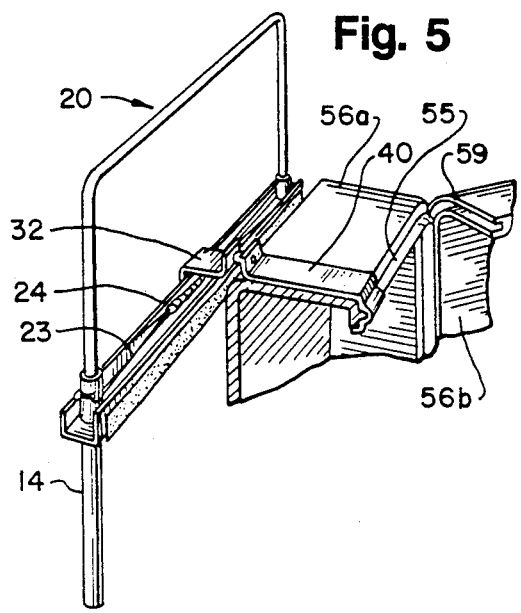
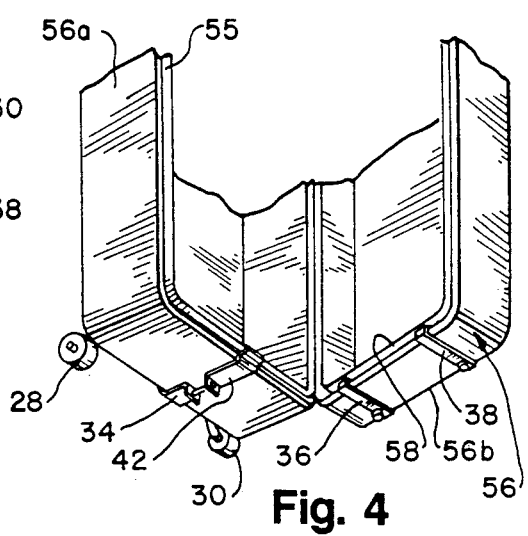
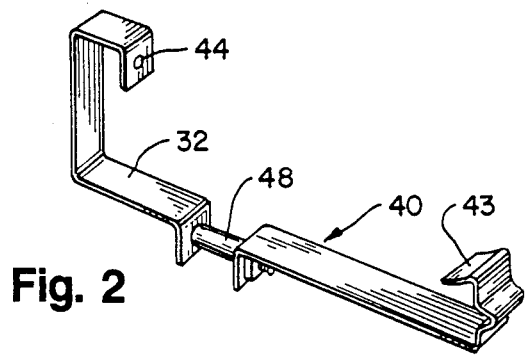
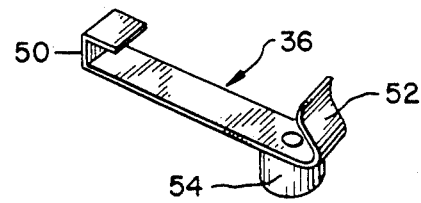

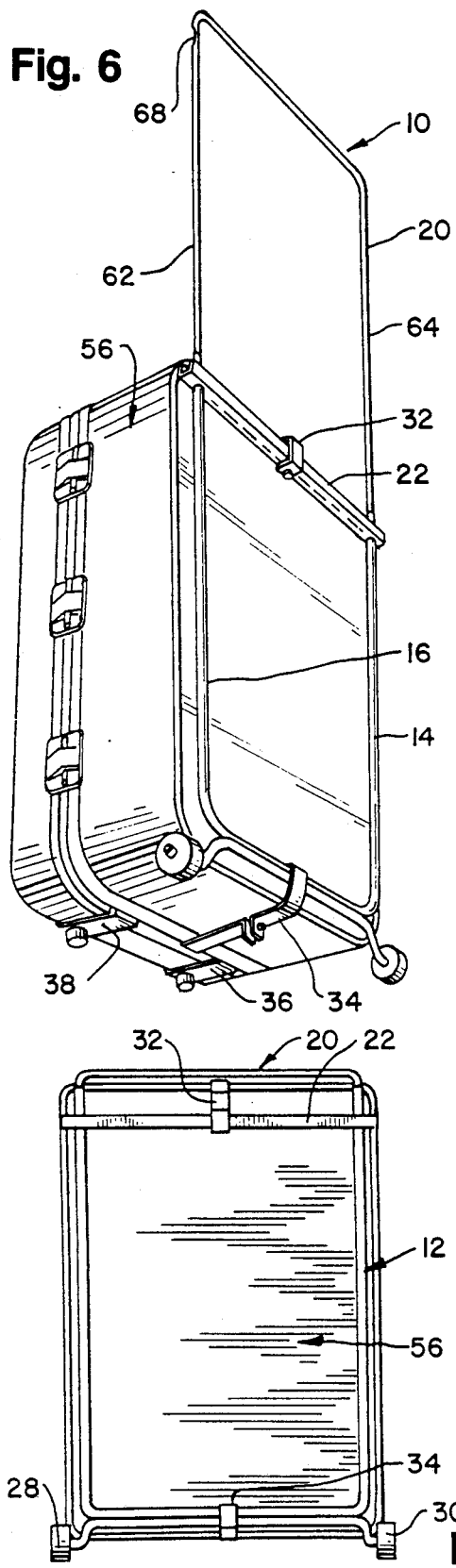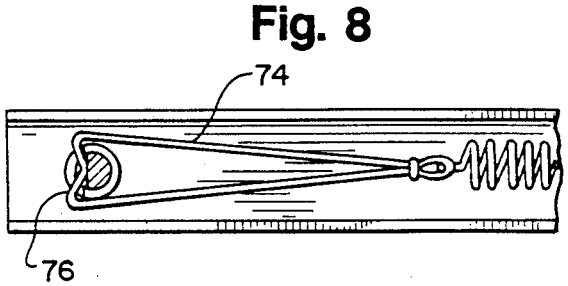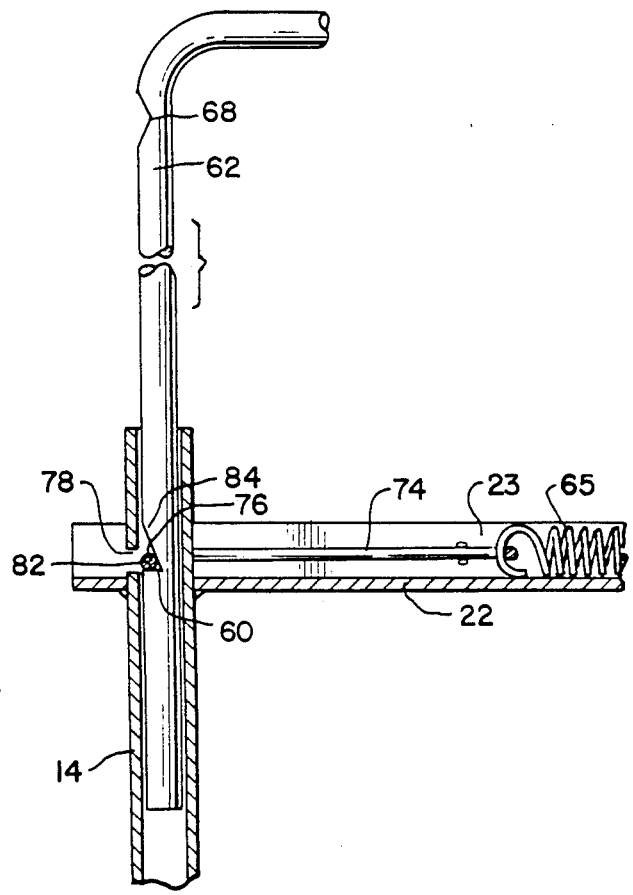

LUGGAGE CART

BACKGROUND OF THE INVENTION

1. Field of the Invention

The invention relates to hand carts for transporting luggage and more particularly to hand carts which are attached to the luggage during transportation and which remain attached to the luggage during stowage.

2. Description of Prior Art

Hand operated devices which improve the ease with which an individual transports luggage while walking from one location to another, for example, in an airport terminal and in the aisles of an airplane, fall broadly into two categories, devices built-in to the luggage itself and carts on which luggage is positioned and then secured by flexible straps.

Various types of suitcases have integral wheels and a retractable handle forming a permanent part of the suitcase. In this suitcase, the wheels and handle are designed to remain substantially within the overall contour of the case to enable the case to be easily carried by hand or pulled along on the wheels by grasping the handle and pulling the case along. Since the wheels and handle are within the general contour of the case, they do not present an obstacle or encumberance when the case is stowed, particularly in a confined storage compartment or under a seat such as those of today's passenger airliners. Not all pieces of luggage, however, include such built-in transportation equipment. Those pieces that do not, must be transported by using a detachable cart.

A number of detachable carts suitable for improving the ease of transportation of a piece of luggage are commercially available. These carts have many different constructions but typically include a base support on which the luggage is rested, a handle portion, and fibre or elastic straps to retain the luggage in contact with the cart. Carts utilizing elastic straps to hold the luggage in position tend to be difficult to maneuver and are not suitable for stowing with the luggage due to the relative insecurity of the attachment to the luggage. The attachment, disconnection and reattachment of the luggage to the cart which is required each time a detachable cart is used to transport luggage to and from a port of stowage can be a considerable nuisance. In addition, once removed from the luggage a cart itself becomes an item of luggage. These factors make the use of detachable carts cumbersome and the cart, as extra hand luggage, may cause special problems for air travellers whose hand luggage allowance is restricted.

One prior art cart adapted for stowage with the luggage includes a rectangular wheeled frame that is strapped to provide wheels on one face of the luggage to ease transportation. As the straps pass around the entire piece of luggage, the cart does not allow the luggage to be opened during transit without untying the straps. This type of cart may, therefore, be inconvenient to use for air travel because of the number of security and customs checks that may be required.

There is a need, therefore, for an improved luggage cart that is attachable to a piece of luggage for transportation and can remain with the luggage throughout a journey and that does not interfere with opening of a piece of luggage for inspection.

OBJECTS OF THE INVENTION

Accordingly, it is an object of this invention to provide an improved luggage cart that meets the aforementioned needs.

It is a specific object of this invention to provide a luggage cart that is physically connected to the luggage and which remains with a piece of luggage during stowage.

It is another object of this invention to provide a cart which is connected to a piece of luggage and yet does not restrict the luggage from being opened without detaching the cart.

Other objects, advantages and features of this invention will become apparent on reading the following description and appended claims, and upon reference to the accompanying drawings.

SUMMARY OF THE INVENTION

In accordance with the preferred embodiment of this invention a luggage cart comprises a support structure for supporting a piece of luggage having a first part with a rim and a second part with a rim, the rim of the first part and the rim of the second part joining along an interface having an outer contour to bring the first and second parts together to form a compartment. A rotating member is attached to the support structure for facilitating movement of the cart. A restraining member is also attached to the support structure and includes a portion extending at least partially within the outer contour of the interface between the rims. The restraining member provides a reaction force on the rim of the first part of the luggage to urge the luggage against the supporting structure.

The support structure and restraining member includes a pair of brackets spaced apart at sufficient distance to accept a piece of luggage. The brackets have a profiled portion configured to conform to the cross-sectional contour of the rim of the first part of the luggage. The brackets are resilient and the profiled portions provide a reaction force that prevents the luggage from moving relative to the cart.

The support structure includes a retractable handle adapted to be secured in an extended position and easily movable between extended and retracted positions. The support structure includes a U-shaped tubular member having first and second hollow arms into which the legs of the U-shape handle are disposed for movement between extended and retracted positions. A locking mechanism is used to maintain the handle in its extended position. The locking mechanism includes a pair of notches in the outer faces of handle legs positioned to correspond to a pair of slots in the arms of the support structure. A pair of detents are disposed one in each slot and tensioned by a spring located between the legs of the handle to maintain their position. Each notch is configured to allow movement of the handle relative to the detents in a first direction when the slots and notches are aligned but prevent it in the opposite direction by providing an abutment to the movement.

BRIEF DESCRIPTION OF THE DRAWINGS

For a more complete understanding of this invention, reference should now be made to the embodiment illustrated in greater detail in the accompanying drawings and described by way of example only. In the drawings:

FIG. 1 is a perspective view of the cart of this invention;

FIG. 2 is a perspective view of a bracket used to secure the cart to the case;

FIG. 3 is a bumper member used in conjunction with the cart of FIG. 1;

FIG. 4 is a partial perspective view of a half open case showing installation of the cart of FIG. 1;

FIG. 5 is a partial perspective of the open case of FIG. 4 from the opposite end showing installation of the cart of FIG. 1;

FIG. 6 is a perspective view of the case with the cart in position and the handle extended;

FIG. 7 is a view of the cart of FIG. 6 with the handle retracted.

FIG. 8 is a section through the handle of the cart of FIG. 1 showing the locking mechanism in the handle;

FIG. 9 is a section through the handle of the cart of FIG. 1 in a direction perpendicular to that of FIG. 8.

DETAILED DESCRIPTION OF THE DRAWINGS

Turning to FIG. 1 of the drawings a cart 10 suitable for attachment to a piece of luggage is shown. The cart 10 includes a U-shaped frame 12 that has a pair of tubular arms 14, 16 and a base portion 18. An upturned U-shaped handle 20 is slidably inserted into the tubular arms 14, 16 of the frame 12. A cross bar 22, having a channel 23, holds the frame in shape and provides room for a locking mechanism generally designated 24 to hold the handle 20 in one of two positions, extended for pulling the cart or retracted for storage. An axle 26 is connected to the base portion 18 of the frame 12, first and second wheels 28, 30 are pivotally attached to the axle 26 one at each end. An upper bracket 32 attached to a hooked member 40 is shown exploded from the cross bar 22. A lower bracket 34 and hooked member 42 similar to the upper bracket 32 and hooked member 40 are shown attached to the base portion of the frame 12. First and second bumpers brackets 36, 38, for attachment to a piece of luggage, are shown located in the position they would occupy on attachment to a piece of luggage.

The upper and lower brackets 32, 34 are attached to the frame 12 spaced apart by a distance sufficient to allow a piece of luggage to be placed between them. In the embodiment illustrated, the upper and lower brackets are fixed in location relative to one another. As an alternative, however, the upper bracket 32 could be movable relative to the lower bracket 34 to allow a variety of sized pieces of luggage to be accommodated. The hooked members 40, 42 are configured to be clamped in position between the upper and lower sealing rims of a piece of luggage and prevented from withdrawal once the two rims are fastened together.

The configuration of the upper bracket 32, hooked member 40, and the bumper bracket 36 can be seen in FIGS. 2 and 3. The bracket 32 is shaped to clip over the cross bar 22 and has a hole 44 through which a fastener 46, seen in FIG. 1, is inserted for attachment to the cross bar 22. The lower bracket 34, adapted for attachment to the base portion 18 of the U-shaped frame 12 is similar to the upper bracket 32 but is curved at one end rather than angular as is bracket 32, for attachment to the tubular base portion 18. Each upper and lower hooked member 40, 42 is configured to conform to the contour of a first rim 55 of a first part 56a of a piece of luggage and includes a lip 43. A spacer 48 allows the distance between the bracket 32, 34, and hooked member 40, 42 respectively to be varied to accommodate luggage having differing depths and to facilitate installation. The brackets 32, 34 and hooked members 40, 42, may, however, be connected without the spacer 48.

The bumper bracket 36, shown in FIG. 3, is configured to clip on to a second 56 part 56b of a piece of luggage (see FIG. 4). The first end 50 clips over the outer ledge 59 of the second rim 58 of the luggage so as not to interfere with closure. The second end 52 is configured to hook over the exterior wall of the second part 56a of a piece of luggage. The second end 52 can be a spring form to aid attachment to the luggage. A bumper 54 is attached to the underside of the bumper bracket 36 to keep the luggage from making contact with the ground when the luggage is placed on end.

In FIGS. 4 and 5 the manner in which a piece of luggage is attached to the cart 10 can be seen more clearly. To install the cart, the upper hooked member 40 is hooked over the first rim 55 of the first part 56a of a suitcase 56. The contour of the hooked member 40 conforms exactly to the cross-sectional contour of the rim of the suitcase 56. The lip 43 is situated within the outer contour of the case 56. The profile of the bracket keeps it attached to the luggage and allows the luggage to be shut without obstruction. The lower hooked member 42 is attached in a similar manner to the lower rim 55 of the suitcase 56 on a side opposite to that to which the upper bracket 32 is hooked. The bumper brackets 36, 38 of FIG. 4, are hooked over the outer edge 59 of the second rim 58 of the suitcase 56 and over the outer edge of the suitcase 56. The second end 52 snaps into position to hold the bumper bracket in place. The suitcase 56 might have beading or some other decoration that further encourages the bumper brackets 36, 38 to remain attached to the case.

Once the upper and lower hooked members 40, 42 and the bumpers brackets 36, 38 are positioned on their respective rims 55, 58 of the suitcase 56, the suitcase 56 is closed and the two portions locked together. The upper rim 58 of the suitcase 56 is then located outside the lower rim 55 and the hooked members 40, 42 and bumper brackets 36, 38 are clamped in position. The lips 43 of the upper and lower brackets 32, 34 abut the inside of the rim of the case and prevent them from being withdrawn from the case 56. The hooked members 40, 42 are then attached to upper and lower brackets 32, 34 respectively on the U-shaped frame by screws 44. The suitcase 56 is thereby attached for transportation by the cart 10.

In FIG. 6 the cart 10 is illustrated with the U-shaped handle 20 in the extended position suitable for pulling or pushing the luggage. As the hook members 40, 42 are clamped between the first and second rims 55, 58 of the suitcase 56, the cart 10 is securely fastened to the luggage and can remain attached during stowage. Once the luggage has reached its destination, for example the check-in counter at an air terminal, the U-shaped handle 20 is retracted and the cart profile is similar to that of the luggage. This can be seen in FIG. 9. Smaller luggage may be carried on board an aircraft or other transport and stowed under a seat. The cart is then useful in wheeling the luggage along aisles to a seat.

When the luggage is reclaimed or removed from under a seat, the traveller can extend the U-shaped handle 20 immediately and wheel the luggage away without having to contend with the bothersome procedure of attaching a cart to the luggage or finding a trolley. Flight attendants and other frequent air travellers would be particularly well served by a cart of this invention.

Particular hooked members and brackets may be manufactured to conform to the rim contours of different types of luggage and to accommodate luggage having lower compartments of different depths or shapes. A variable length spacer 48 could also be used to accommodate luggage of different depths. The U-shaped frame 12 could, however, be similar for all suitcases the frame being designed to fit suitcases falling within a specified size range. Alternative hooked members could be made available independently of the frame to allow a single frame to be used with pieces of luggage of a variety of shapes and sizes. A cart of this invention can be used to transport suitcases, trunks or boxes. Any piece of luggage in fact, that has a pair of rims that are clamped securely together during transit can be transported using the cart of this invention provided the hooked members have a suitable profile.

The hooked members and bumper brackets can alternatively be attached permanently to the luggage by stitching, adhesive, snap fasteners or other means, the brackets forming a permanent part of the luggage sold. In these circumstances the hooked members need not be contoured to fit over the rim of the luggage as the permanent or semi permanent attachment could provide restraining force. The hooked members could be conformed for connection to a wheeled frame similar to that disclosed or for attachment to a wheeled frame of another suitable configuration. The connection between the hooked members and the brackets attached to the wheeled frame may be detachable to allow different pieces of luggage to be attached to a frame at different times. Alternatively the attachment could be permanent for improved mobility.

FIGS. 8 and 9 show the locking mechanism 24 used to allow the U-shaped handle 20 to be maintained in one of two positions. The handle 20 has a first notch 60 on each of a first and a second leg 62, 64 of the handle 20 for holding the handle 20 in the extended position and preventing further extension. The first and second legs each also have a second shallow notch 68 for preventing the handle 20 from extending from the retracted position during stowage. The channel 23 of the cross bar 22 houses a tension spring 65 maintaining a wire form 74 attached to each side of the tension spring 65 in one of a pair of slots 78 disposed one in each arm 14, 16 of the U-shaped frame 12. The position of the first and second notches 60 and 68 in the handle 20 is such that the notches and slots are aligned for two positions of the handle 20. Each wire form 74 has a detent 76 that is held in one of the slots 78 at all times by the tension spring 65. The detent 76 is held in contact with one of the legs 62, 64 of the handle at all times through the slot. When the slots and the notches align, the detent 76 is pulled into the notch 60 or 68 by spring tension. The first notch 60 is configured to allow the handle to move in one direction only relative to the detent 76. The first notch 60 includes an abutment wall 82, and a sloped wall 84. The abutment wall 82 of the notch 68 prevents the handle being extended beyond the extended position illustrated because of the abutment between the wall 82 and the detent 76. The sloped wall 84 allows the detent 76 to be eased outward as the handle is lowered to allow the handle 20 to be retracted. The second notch 68 is shallow and prevents the handle from extending without exertion of some force to overcome the spring tension. The notch is sufficiently shallow to allow the handle to be extended by a user. The two position handle allows the profile of the cart to be reduced for stowage. The locking mechanism allows the handle to be pulled out and pushed in with ease between the two positions.

Although the cart illustrated in FIGS. 1-9 includes a tubular frame member for attachment to the luggage, any frame that provides an attachment for upper and lower hooked members of the type described would be suitable. One type of frame might simply be a metal panel of lesser dimension than the bottom of the luggage to be transported. Likewise the handle can be of any structure as long as it can be disposed in a position where the luggage and cart has a suitable profile. In some instances it may also be possible for the cart to have a single bracket rather than the upper and lower brackets illustrated in the FIGURES. The single bracket should be made from material sufficiently resilient and durable to support the weight of the luggage.

An alternative embodiment of this invention may include a flexible strap attached to a lower bracket having sufficient strength to support the weight of the luggage. The strap is passed between the two compartments of the luggage and attached to the support structure in order to attach the luggage to the cart. Once the luggage is clamped and locked in the closed position, the strap is held taut and supplies the restraining force to the luggage. The luggage can be opened without untying the straps and the cart works in all respects as it would with the brackets and hooked members of the previous embodiment. One advantage of using a strap in preference to a pair of brackets would be the flexibility this would provide in the sizes of pieces of luggage that could be transported by the cart as the strap could be buckled to provide different attachment lengths.

The luggage cart of this invention is firmly secured to the luggage and adapted for stowage with the luggage with obvious advantages. It is simple to attach to luggage and does not require straps around the outside of the luggage and other features usually associated with individual travel carts that often make their use inconvenient. The use of hooked members allows luggage to be opened in transit without untying straps or other means by which luggage is customarily attached to a cart. This ensures that the cart of this invention is ideally suited for transporting luggage for air travel where luggage must often be opened during transit for security or customs checks. It is, however, also likely to be useful for rail and coach travel and any other journey in which luggage must be stowed for part of the trip.

As well as being used as a temporary attachment to a number of pieces of luggage for a particular journey, the cart could also be used as a fixture of the luggage to provide permanent means for transportation of a piece of luggage.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A wheeled cart for transporting luggage having a first part with an exterior wall and a rim having a cross-sectional contour and a second part with a rim, said first part and said second part being interconnected by a hinge for movement between an open position and closed position in which the rim of said first part and the rim of said second part are in abutting relation to form a compartment, the cart comprising:

a supporting structure for supporting the luggage said supporting structure having a handle;

first and second brackets attached to the supporting structure in spaced relation for receiving the luggage therebetween, each of said first and second brackets having a profiled portion which encircles and conforms to the cross-sectional contour of the rim of said first part of said luggage for hooking over the rim of said first part at opposed points, said profiled portion being sufficiently resilient to provide a reaction force for urging the exterior wall of said first part against said supporting structure; and a pair of wheels mounted on an axle attached to said supporting structure wherein said wheeled cart permits said second part to be opened relative to said first part while said supporting structure is attached to said first part.

2. The cart of claim 1 wherein the supporting structure includes a U-shaped tubular member having first and second arms and a base portion and a U-shaped handle having first and second legs slidably disposed within the first and second arms of said U-shaped tubular member respectively, said handle being movable between extended and restracted positions.

3. The cart of claim 2 further comprising a locking mechanism for maintaining the handle in said extended position.

4. The cart of claim 2 wherein each of said first and second arms of said U-shaped tubular member has an outer side configured to define a slot and each of the legs of said handle is configured to define a notch for alignment with the slot of the corresponding arm of said U-shaped tubular member and further comprising a first and second detent located within the slots of the first and second arm respectively and maintained in position by a tensioning member located between the arms of the U-shaped tubular member.

5. The cart of claim 4 wherein the tensioning member is a spring.

6. The cart of claim 1 further comprising a bumper member for clamping between the rim and an exterior wall of said second part of said luggage for preventing abrasion of said luggage when resting the cart in an upright position.

7. A wheeled cart for transporting luggage having a handle movable between first and second positions and including a locking mechanism for maintaining the handle in at least one of the first and second positions, comprising:

a handle having first and second spaced legs with first and second opposed outer faces formed on respective ones of said legs, said first and second opposed faces being configured to define first and second spaced notches, respectively;

a support structure including a sleeve for receiving each leg of said handle for movement in a pair of opposed directions, said sleeve having first and second opposed outer walls which are aligned with the opposed outer faces of said legs, the first and second outer walls being configured to define first and second slots, said first and second slots each extending in a direction substantially perpendicular to said pair of opposed directions, said slots being located for alignment with the notches of said handle to define relative positions of said handle with respect to said sleeve;

a first detent located within the first slot;

a second detent located within the second slot;

tensioning means located between said first and second outer walls of said sleeve and interconnecting said first and second detents for maintaining said first and second detents in position in their respective slots and for biasing said first and second detents inwardly into respective ones of said first and second notches thereby maintaining said handle and said sleeve in a fixed position against motion in a first of said pair of opposed directions;

means for attaching a piece of luggage for movement with said support structure; and a wheeled member attached to said support structure.

8. The cart of claim 7 wherein said first and second notches have a sloping wall and an abutment wall opposite said sloping wall.

9. The cart of claim 7 wherein said means for attaching includes first and second brackets attached to said support structure in spaced relation for receiving a piece of luggage having a first part with an exterior wall and a rim having a cross-sectional contour and a second part with a rim, said first part and said second part being interconnected by a hinge for movement between an open position and closed position in which the rim of said first part and the rim of said second part are in abutting relation to form a compartment, each of the first and second brackets having a profiled portion which encircles and conforms to the cross-sectional contour of the rim of said first part of said luggage for hooking over the rim of said first part at opposed points the profiled portion being sufficiently resilient to provide a reaction force for urging the exterior wall of said first part against said support structure.

* * * * *